EMMA B. CARVER.
FOLDING FLOWER BALCONY AND STAND.
No. 181,639. Patented Aug. 29, 1876.
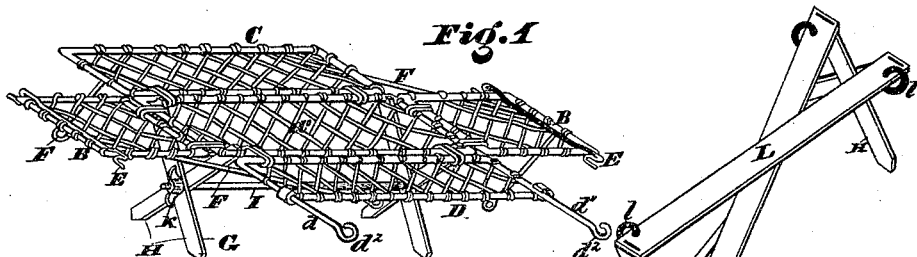
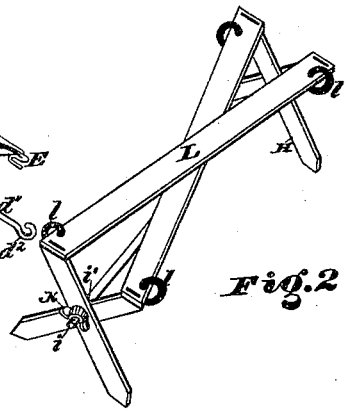
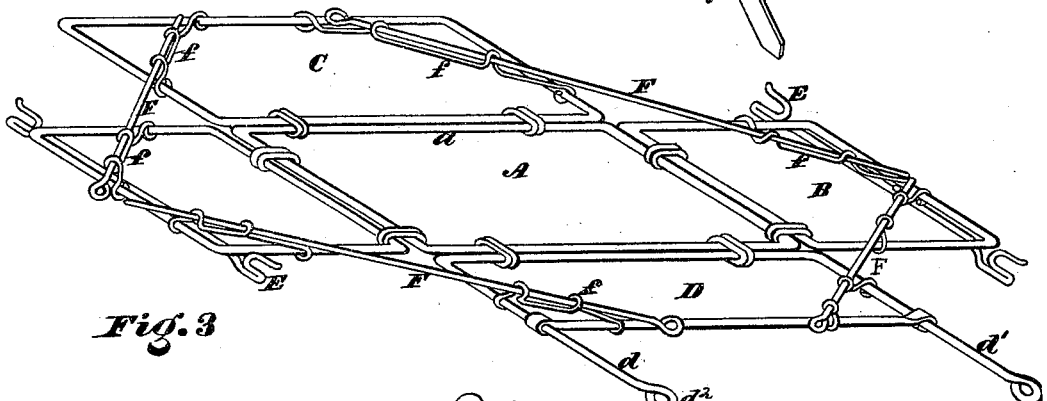
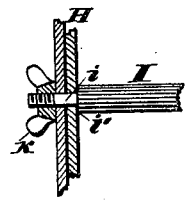
Witnesses
Saml. J. Van Stavoren
Jos. B. Connolly
Inventor
Emma B. Carver,
Connolly Bros., Attorneys

UNITED STATES PATENT OFFICE.

EMMA B. CARVER, OF PHILADELPHIA, PENNSYLVANIA.

IMPROVEMENT IN FOLDING FLOWER BALCONY AND STAND.

Specification forming part of Letters Patent No. 181,639, dated August 29, 1876; application filed June 30, 1876.

*To all whom it may concern:*

Be it known that I, EMMA B. CARVER, of Philadelphia, in the county of Philadelphia and State of Pennsylvania, have invented certain new and useful Folding Flower Balcony and Stand; and I do hereby declare the following to be a full, clear, and exact description of the invention, such as will enable others skilled in the art to which it pertains to make and use it, reference being had to the accompanying drawings, which form part of this specification, in which—

Figure 1 is a perspective of my invention when used as a table or stand. Fig. 2 is a modification of the table-support. Fig. 3 is a perspective of the table inverted, the woven wire being broken away. Fig. 4 is a perspective of the flower-balcony; Fig. 5, detail section.

The object of my invention is to provide a device which I term a flower-balcony, and which is intended for the reception of pots containing plants, said balcony being intended to hang out of windows, to allow said plants the benefit of sunshine and fresh air, and being convertible into a stand and portable table, upon which said pots and plants can be arranged indoors.

My invention, accordingly, consists of a convertible folding flower balcony and stand or table, constructed as hereinafter more fully described.

Referring to the accompanying drawing, A designates an oblong frame formed of an iron rod or bar, $a$, and wire-work $a'$, the latter being twisted, woven, or otherwise arranged in any suitable manner. B, B, and C are similarly-constructed frames, hinged to the frame A, so as to fold thereon, as shown in Fig. 4, and turn up to form the sides of a case, as shown in Fig. 4. D is another narrower frame of similar construction, having, however, two rods or bars, $d$ $d^1$, the ends of the latter being turned to form hooks or eyes $d^2$, by means of which the balcony may be hung upon nails driven in the wall outside the house.

When the frames turn up, as in Fig. 4, they are retained in the position shown by means of spring-clamps or catches E, or by other equivalent devices, such as hooks or latches.

To form a stand, the sides of the balcony are turned down until they are brought in the same plane with the frame A, and are held in this position by means of rods F F passing through eyes $ff$.

The leaf thus formed may be laid upon a table, affording space for ventilation below the bottom of the pots and said table, or it may, by preference, be set upon a stand or support, G, and said pots then placed upon it. Said stand is formed of the legs H H, which are arranged in the form of an X, at each end of a bar, I. Said bar I is turned down to form a smooth journal, $i$ $i$, at each end, on which the legs are placed, being held in position and screwed or forced up against the shoulders $i'$ $i'$ by thumb-nuts K K.

To pack this contrivance for transportation, or to stow away when not in use, the rods F F are withdrawn from the eyes $ff$, and the sides B B C D folded down upon the frame or bottom A.

The legs H H are taken off the rod or bar I, and said bar and legs, with the rods F F, laid on said frame A.

A modified form of stand is shown in Fig. 2, wherein diagonal bars L are used to connect the upper ends of the legs H H to prevent wabbling, rings $l$ $l$ being also employed to make a more secure connection with the frame A.

What I claim as my invention is—

1. A folding flower-balcony, composed of the bottom or frame A, and hinged sides B B C D, substantially as shown and described.

2. In combination with the folding sides of a flower-balcony, the holding devices E for holding said sides in an upright position, substantially as shown and described.

3. In combination with the folding sides B B C D, formed or provided with eyes or loops $ff$, the rods F for retaining said sides in the same plane as the bottom or frame A, substantially as shown and described.

4. The combination of the convertible flower balcony and stand, composed of the frames A B C D, with the stand G, composed of bar I and legs H H, the several parts being constructed and arranged for operation, substantially as shown and described.

In testimony that I claim the foregoing I have hereunto set my hand this 26th day of June, 1876.

EMMA B. CARVER.

Witnesses:
J. HENRY CARVER,
CHAS. F. VAN HORN.